United States Patent
Matsuo et al.

(10) Patent No.: US 9,586,546 B2
(45) Date of Patent: Mar. 7, 2017

(54) FRONT STRUCTURE OF VEHICLE

(71) Applicant: TOYOTA JIDOSHA KABUSHIKI KAISHA, Toyota-shi (JP)

(72) Inventors: Yuji Matsuo, Kariya (JP); Kenta Nomura, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/307,735

(22) Filed: Jun. 18, 2014

(65) Prior Publication Data
US 2015/0001880 A1 Jan. 1, 2015

(30) Foreign Application Priority Data

Jun. 27, 2013 (JP) ................................. 2013-135355

(51) Int. Cl.
*B60R 19/18* (2006.01)
*B60R 19/04* (2006.01)
*B62D 25/08* (2006.01)
*B60R 19/24* (2006.01)

(52) U.S. Cl.
CPC ............ *B60R 19/18* (2013.01); *B62D 25/082* (2013.01); *B60R 19/04* (2013.01); *B60R 2019/186* (2013.01); *B60R 2019/247* (2013.01)

(58) Field of Classification Search
CPC ... B60R 19/04; B60R 19/18; B60R 2019/186; B60R 2019/247; B60R 2019/1866; B62D 25/082

USPC ....................................................... 296/187.1
See application file for complete search history.

(56) References Cited

U.S. PATENT DOCUMENTS

| 8,454,080 B2 | 6/2013 | Qu et al. |
| 8,505,990 B2 * | 8/2013 | Czopek et al. ............... 293/102 |
| 2009/0160204 A1 | 6/2009 | Czopek et al. |

FOREIGN PATENT DOCUMENTS

| JP | 2008-213739 A | 9/2008 |
| JP | 2012-228907 | 11/2012 |

OTHER PUBLICATIONS

Japanese Office Action issued Apr. 26, 2016 in Patent Application No. 2013-135355 (without English Translation).

* cited by examiner

*Primary Examiner* — Glenn Dayoan
*Assistant Examiner* — Melissa A Black
(74) *Attorney, Agent, or Firm* — Oblon, McClelland, Maier & Neustadt, L.L.P.

(57) ABSTRACT

A front structure of a vehicle includes two side members extending in a front-rear direction of the vehicle and a bumper beam located in front of the side members and extending in a lateral direction of the vehicle. The bumper beam is fixed to the side members and includes outer sections located outward in the lateral direction from the corresponding side members. A transfer portion extends generally rearward in the front-rear direction from at least one of the outer sections. An insertion portion is inserted into the at least one of the outer sections.

11 Claims, 4 Drawing Sheets

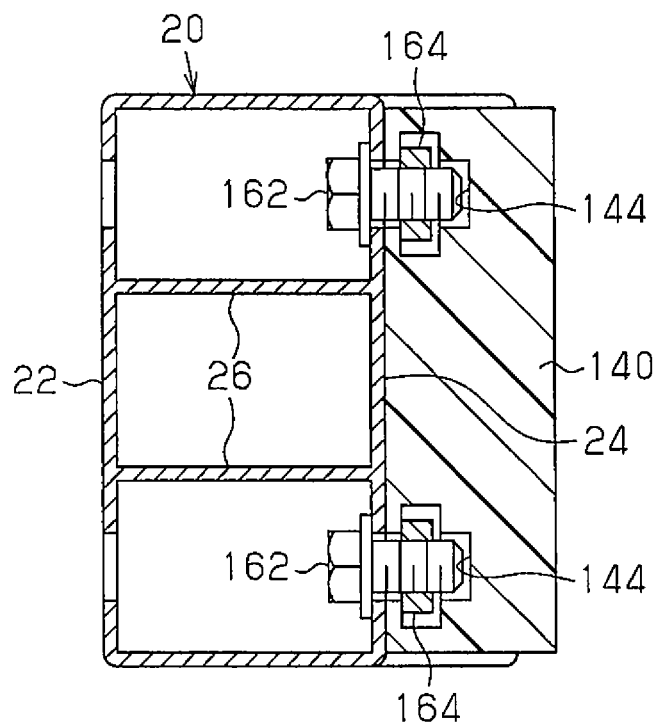

FRONT STRUCTURE OF VEHICLE

BACKGROUND OF THE INVENTION

The present invention relates to a front structure of a vehicle that includes two side members extending in the front-rear direction of the vehicle.

In general, a vehicle includes two side members and a bumper beam in the front section. The two side members extend in the front-rear direction of the vehicle. The bumper beam extends in the lateral direction of the vehicle in front of the side members and is fixed to the side members.

In a frontal collision of the vehicle, most of the collision energy is transferred to the side members through the bumper beam and absorbed by the side members.

When a section of the vehicle that is located outward from a side member in the lateral direction of the vehicle collides with a pole-shaped obstacle such as a power pole or a signpost, the side member may not be able to absorb the collision energy in a preferred manner.

To solve this problem, Japanese Laid-Open Patent Publication No. 2012-228907 discloses a vehicle front structure in which each of the side members includes a first projection extending outward in the lateral direction of the vehicle from the side section of the side member. In addition, the bumper beam includes bumper beam extensions on opposite ends of the bumper beam. Each bumper beam extension extends outward in the lateral direction of the vehicle and includes a second projection extending toward the corresponding first projection.

When the section of the vehicle that is located laterally outward from the side member, namely, the bumper beam extension, collides with a pole-shaped obstacle, the bumper beam extension moves rearward, and the second projection of the bumper beam extension abuts against the first projection extending from the side member. The abutment of the second projection against the first projection transfers the collision energy applied to the bumper beam extension to the side member through the first and second projections.

In general, a bumper beam is hollow to absorb some of the collision energy and to reduce the weight of the bumper beam. However, the following problem may arise when such a hollow bumper beam includes a transfer portion that transfers collision energy like the second projection of the '907 publication. When absorbing collision energy, the end of the bumper beam undergoes plastic deformation that crushes the cross-sectional shape of the bumper beam. In addition, the transfer portion moves rearward together with the bumper beam and abuts against a side member. That is, the cross-sectional shape of the bumper beam is crushed to some extent before the transfer portion abuts against the side member. Thus, the transfer of collision energy to the side member through the transfer portion is delayed. This, in turn, delays the transfer of the collision energy from the side member through a mount to the engine and the transmission. As a result, it becomes difficult to quickly move the vehicle away from the obstacle.

SUMMARY OF THE INVENTION

It is an object of the present embodiment to provide a front structure of a vehicle that quickly transfers collision energy to a side member through a transfer portion in a frontal collision of the vehicle.

To achieve the above object, one aspect of the present invention is a front structure of a vehicle that includes two side members extending in a front-rear direction of the vehicle and a bumper beam located in front of the side members and extending in a lateral direction of the vehicle. The bumper beam is fixed to the side members and includes outer sections located outward in the lateral direction from the corresponding side members. A transfer portion extends generally rearward in the front-rear direction from at least one of the outer sections. An insertion portion is inserted into the at least one of the outer sections.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a cross-sectional view showing a bumper beam and a transfer portion in a comparison example.

DETAILED DESCRIPTION OF THE PREFERRED EMBODIMENTS

Referring to FIGS. 1 to 7, one embodiment of a front structure of a vehicle will now be described.

Figure 1:
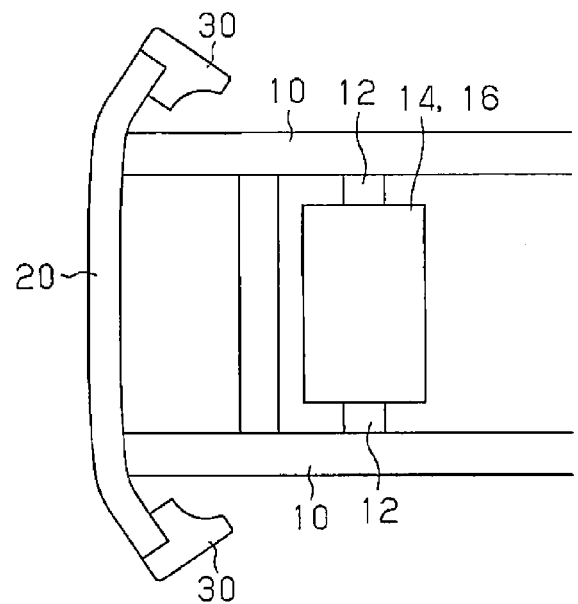
FIG. 1 is a plan view showing a front structure of a vehicle of one embodiment.

As shown in FIG. 1, the front section of the vehicle includes two side members 10 extending in the front-rear direction of the vehicle (hereinafter simply referred to as the front-rear direction). The front ends of the side members 10 are fixed to a hollow bumper beam 20 extending in the lateral direction of the vehicle (hereinafter simply referred to as the lateral direction).

Figure 2:
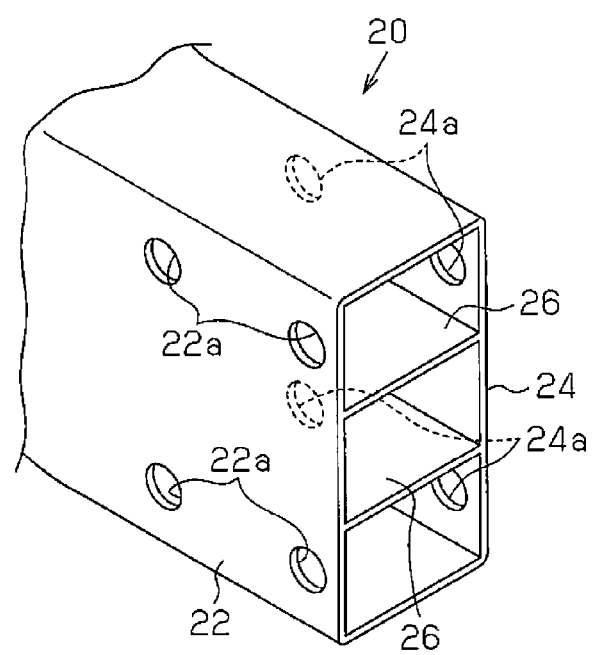
FIG. 2 is a perspective view showing the bumper beam of the front structure of FIG. 1.

As shown in FIG. 2, the bumper beam 20 is tubular and has a rectangular cross-section. The bumper beam 20 includes a front wall 22, a rear wall 24, and two partitions 26 extending between the front and rear walls 22 and 24. The partitions 26 are separated from each other in the vertical direction. The partitions 26 divide the bumper beam 20 into three compartments aligned in the vertical direction. In other words, a cross-sectional view of the bumper beam 20 in a direction perpendicular to the longitudinal direction of the bumper beam 20 shows the interior divided into a plurality of compartments. The bumper beam 20 is an extruded molded product of aluminum alloy, for example.

The front wall 22 and the rear wall 24 of the bumper beam 20 include holes 22a and holes 24a, respectively. The holes 22a and 24a receive bolts 62.

As shown in FIG. 1, the bumper beam 20 includes sections located laterally outward from the side members 10 that extend obliquely such that outer positions are located further toward the rear. The sections of the bumper beam 20 that are located laterally outward from the side members 10 are also referred to as the outer sections.

As shown in FIG. 1, a mount 12 is fixed to each of the side members 10. The mounts 12 support an engine 14 and a transmission 16. A spacer 30, which is made of a hard resin material, is fixed to each of the opposite lateral ends of the bumper beam 20.

Figure 3:
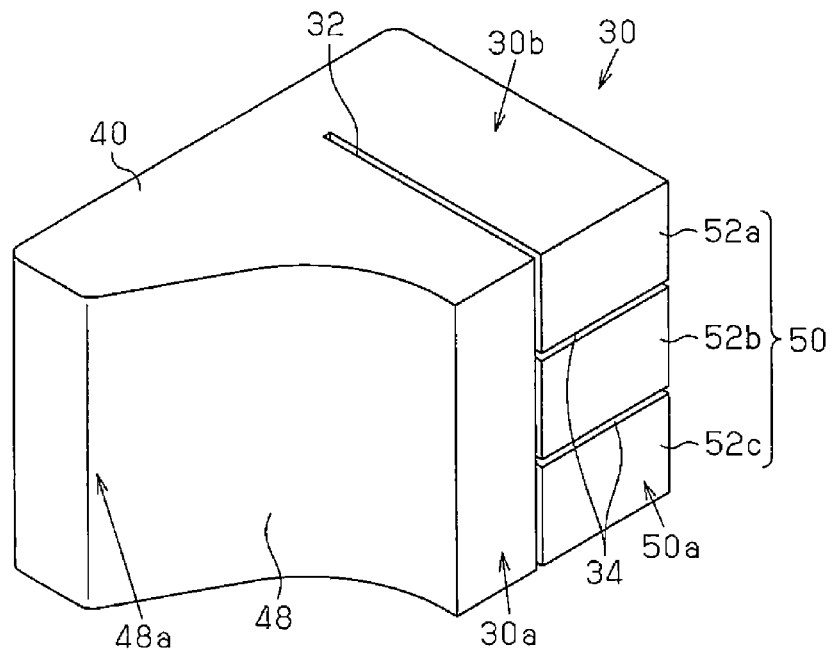
FIG. 3 is a perspective view showing a spacer of the front structure of FIG. 1.
Figure 4:
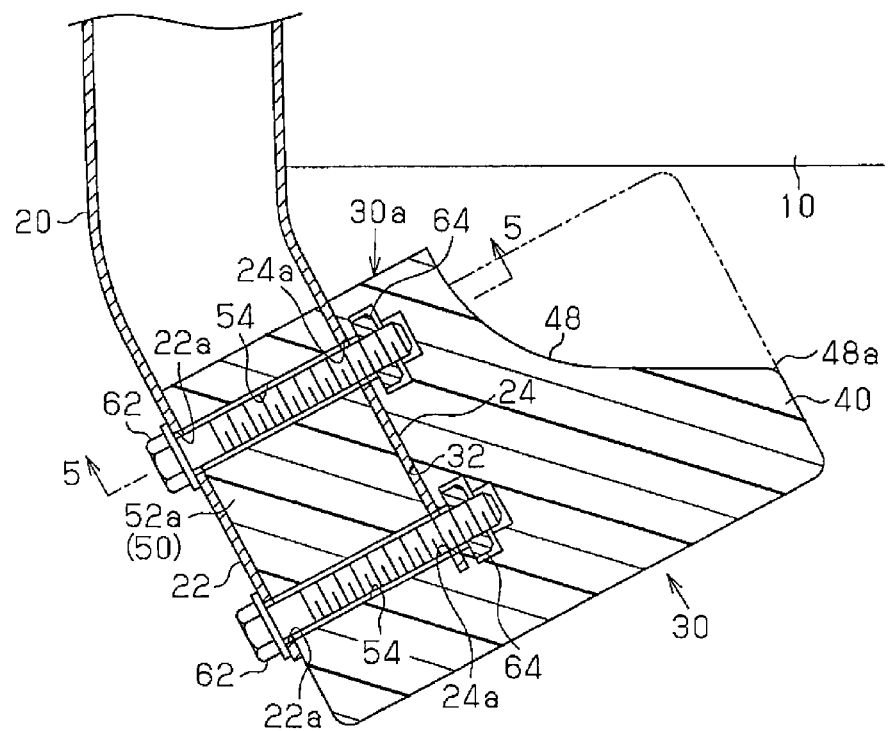
FIG. 4 is a horizontal cross-sectional view showing the bumper beam and the spacer.
Figure 5:
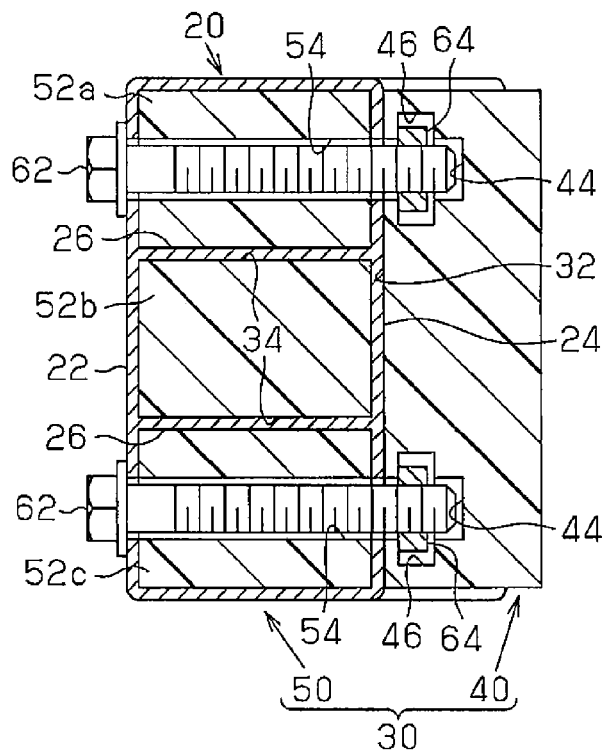
FIG. 5 is a cross-sectional view taken along line 5-5 in FIG. 4.

As shown in FIG. 3, each spacer 30 includes an upper surface 30b and a facing surface 30a that faces the bumper beam 20. The facing surface 30a includes a vertical slit 32 extending perpendicular to the upper surface 30b and the facing surface 30a. As shown in FIGS. 4 and 5, the vertical slit 32 receives the rear wall 24 of the bumper beam 20.

Accordingly, as shown in FIGS. 3 to 5, the vertical slit 32 divides the spacer 30 into a transfer portion 40, which is located rearward in the front-rear direction from the rear wall 24 of the bumper beam 20, and an insertion portion 50, which is located in the bumper beam 20. That is, the transfer portion 40 and the insertion portion 50 are arranged side by side, and the rear wall 24 is located between the transfer portion 40 and the insertion portion 50. The insertion portion 50 is formed integrally with the transfer portion 40 and connected to the transfer portion 40 outside the bumper beam 20.

As shown in FIGS. 4 and 5, the surface of the transfer portion 40 that faces the rear wall 24 includes holes 44 corresponding to the holes 24a of the bumper beam 20. Each hole 44 includes an accommodation portion 46 that has a greater diameter than other portions in the hole 44 and accommodates a nut 64.

As shown in FIGS. 3 and 4, the transfer portion 40 includes a recessed clearance surface 48, which faces the side member 10, and a corner 48a, which is located at the rear end of the clearance surface 48. The clearance surface 48 is formed such that, of all parts of the transfer portion 40, the corner 48a at the rear end of the clearance surface 48 is the first to abut the side member 10 when the outer section of the bumper beam 20 plastically deforms and moves rearward.

The insertion portion 50 includes a facing surface 50a facing the bumper beam 20. The facing surface 50a includes two lateral slits 34 extending parallel to the upper surface 30b of the spacer 30. The lateral slits 34 are separated from each other in the vertical direction. The lateral slits 34 divide the insertion portion 50 into three divided portions 52a to 52c. As shown in FIG. 5, the lateral slits 34 receive the partitions 26 of the bumper beam 20. Thus, the three divided portions 52a to 52c are each inserted into the corresponding one of the three compartments of the bumper beam 20. The divided portions 52a to 52c extend through the entire interior of the outer section of the bumper beam 20 in a generally front-rear direction and in the vertical direction. In other words, in the outer section of the bumper beam 20, the insertion portion 50 extends from the front wall 22 to the rear wall 24 of the bumper beam 20 and from the lower wall to the upper wall.

The first divided portion 52a and the third divided portion 52c of the insertion portion 50 include insertion holes 54 corresponding to the holes 22a of the front wall 22 and the holes 24a of the rear wall 24.

The bolts 62 are inserted from the outer side of the front wall 22 into the corresponding ones of the holes 22a of the front wall 22, the insertion holes 54 of the insertion portion 50, the holes 24a of the rear wall 24, and the holes 44 of the transfer portion 40. Each bolt 62 is fastened to the nut 64 in the accommodation portion 46 of the hole 44. The bolts 62 extend perpendicular to the bumper beam 20. Thus, the transfer portion 40 and the insertion portion 50 of the spacer 30 are fixed to the bumper beam 20 by the commonly shared bolts 62 and the nuts 64. The bolts 62 and the nuts 64 function as coupling members or fastening members. The bolts 62 and the nuts 64 also function to couple the transfer portion 40 and the insertion portion 50 to each other, which are separated by the vertical slit 32.

The operation of the present embodiment will now be described referring to the comparison example shown in FIG. 7.

FIG. 7 shows the cross-section of a transfer portion 140 in a comparison example. Same reference numerals are given to those components that are the same as the corresponding components of the present embodiment. A value of 100 is added to the numerals of the corresponding components.

Figure 6:
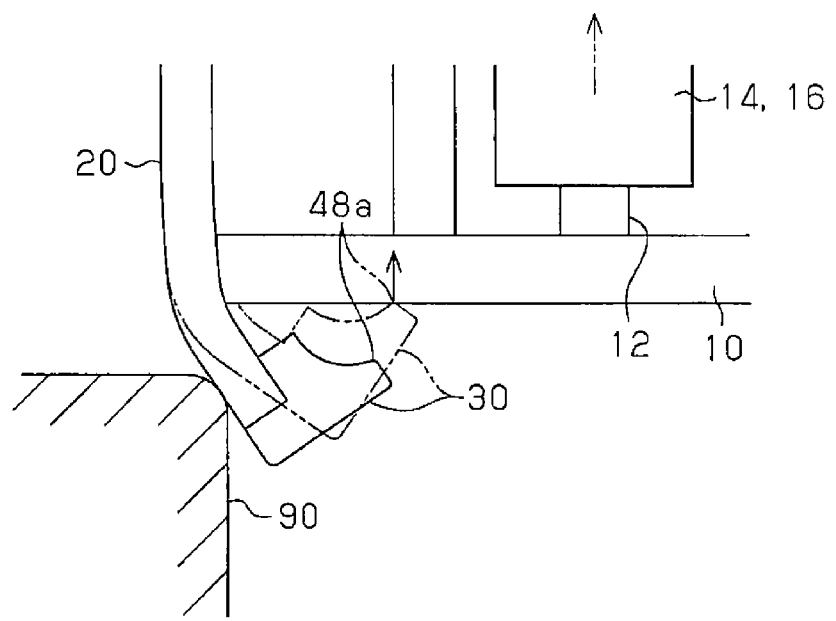
FIG. 6 is a plan view showing the operation of the front structure of FIG. 1.

As shown in FIG. 6, when a lateral end of the bumper beam 20 collides with an obstacle 90 located in front of the vehicle, the outer section of the bumper beam 20 plastically deforms and moves rearward. This brings the spacer 30 into contact with the side member 10 as indicated by the double-dashed lines in FIG. 6.

As shown in FIG. 6, the present embodiment fixes the insertion portion 50 to the inner side of the bumper beam 20 and thus differs from the structure of FIG. 7, which lacks an insertion portion in the bumper beam 20, in that the insertion portion 50 limits crushing of the cross-sectional shape of the bumper beam 20. This limits a delay in the transfer of collision energy to the side member 10 through the transfer portion 40, which would be caused by the crushing of the bumper beam 20. Thus, the collision energy is quickly transferred to the side member 10. This allows the collision energy to be transferred through the side member 10 and the mount 12 to the engine 14 and the transmission 16, which have high rigidity. Thus, in a frontal collision of the vehicle, the vehicle may be quickly moved from the obstacle in the lateral direction as indicated in the double-dashed arrow in FIG. 6.

In addition, the recessed clearance surface 48 of the transfer portion 40 allows the corner 48a of the clearance surface 48 to be the first to contact the side member 10 among the whole transfer portion 40 when the outer section of the bumper beam 20 deforms and moves toward the rear. In the structure indicated by the double-dashed lines in FIG. 4, the transfer portion lacks a clearance surface, and the corner of the transfer portion facing the side member 10 contacts the side member 10. The present embodiment differs from this structure in that when the side member 10 is compressed in the front-rear direction, the present embodiment limits interference of the compression by the transfer portion 40.

The advantages of the present embodiment will now be described.

(1) The spacer 30 includes the transfer portion 40 extending generally rearward in the front-rear direction from the section of the bumper beam 20 that is located laterally outward from the side member 10. The spacer 30 further includes the insertion portion 50 inserted into the outer section of the bumper beam 20.

In a frontal collision of the vehicle, the insertion portion 50 limits crushing of the cross-sectional shape of the bumper beam 20. This limits a delay in the transfer of collision energy from the transfer portion 40 to the side member 10, which would otherwise be caused by the crushing of the bumper beam 20. Thus, the collision energy in a frontal collision of the vehicle can be quickly transferred to the side member 10 through the transfer portion 40. This allows the vehicle to be quickly moved in the lateral direction away from the obstacle.

(2) The bolts 62 and the nuts 64 fix the transfer portion 40 and the insertion portion 50 to the bumper beam 20. Thus, the addition of the insertion portion 50 does not increase the number of bolts or nuts. This facilitates the management of components compared to a structure in which a transfer portion and an insertion portion are fixed to the bumper beam 20 with separate bolts and nuts.

(3) The bolts 62 extend through the corresponding ones of the holes 22a in the front wall 22 of the bumper beam 20, the insertion holes 54 of the insertion portion 50 of the spacer 30, the holes 24a in the rear wall 24 of the bumper beam 20, and the holes 44 in the surface of the transfer portion 40 of the spacer 30 that faces the rear wall 24. Each nut 64 is arranged in the hole 44 and receives the bolt 62. In this structure, the bolts 62, which extend through both the front wall 22 and the rear wall 24 of the bumper beam 20, and the nuts 64, which receive the bolts 62, increase the rigidity of the section of the bumper beam 20 to which the spacer 30 is fixed.

(4) The insertion portion 50 is formed integrally with the transfer portion 40. In addition, the insertion portion 50 is connected to the transfer portion 40 at the outside of the bumper beam 20. The integration of the insertion portion 50 and the transfer portion 40 allows the insertion portion 50 to be added without increasing the number of components. This facilitates the management of components. In addition, the spacer 30 can be easily coupled to the bumper beam 20 compared to a structure in which a transfer portion is discrete from an insertion portion and the transfer portion and the insertion portion are separately coupled to the bumper beam. Further, the insertion portion 50 is connected to the transfer portion 40 at outside of the bumper beam 20, and the bolts 62 extend through the insertion holes 54 of the insertion portion 50. This limits separation of the spacer 30 from the bumper beam 20 in a frontal collision of the vehicle.

(5) The three divided portions 52a to 52c of the insertion portion 50 extend through the entire interior of the outer section of the bumper beam 20 in a generally front-rear direction. This effectively limits crushing of the cross-sectional shape of the bumper beam 20 in a frontal collision of the vehicle. Accordingly, the transfer of collision energy to the side member 10 through the transfer portion 40 is not delayed, and the collision energy is effectively transferred to the side member 10. This allows the vehicle to be quickly moved in the lateral direction.

(6) The partitions 26 divide the interior of the bumper beam 20 into three compartments arranged in the vertical direction. All of the three compartments receive the insertion portion 50. Such a structure limits crushing of the cross-sectional shape of the bumper beam 20 compared to a structure in which only one or two of the three compartments receives an insertion portion. This limits a delay in the transfer of collision energy to the side member 10 through the transfer portion 40. Thus, the collision energy is effectively transferred to the side member 10.

It should be apparent to those skilled in the art that the present invention may be embodied in many other specific forms without departing from the spirit or scope of the invention. Particularly, it should be understood that the present invention may be embodied in the following forms.

Not all of the three compartments of the bumper beam 20 need to receive the insertion portion 50. For example, only one or two of the three compartments of the bumper beam 20 may receive a divided portion of an insertion portion.

The interior of the bumper beam does not have to be divided into a plurality of compartments. The interior of the bumper beam may form only one compartment.

The front surface and the rear surface of the insertion portion do not have to be in contact with the inner surface of the bumper beam. The insertion portion may have any structure as long as the insertion portion is arranged in the bumper beam.

The transfer portion may be discrete from the insertion portion. In this case, the bolts 62 and the nuts 64 function as fastening members or coupling members that fix the transfer portion and the insertion portion to the bumper beam 20 and couple the transfer portion to the insertion portion. Further, the transfer portion and the insertion portion may be fixed to the bumper beam with fastening members or coupling members (bolts and nuts for example).

The bumper beam does not have to be formed as a single piece. For example, the bumper beam may include a main body and extensions, which are discrete from the main body and located laterally outward from the side members. In this case, a transfer portion and an insertion portion may be arranged at the end of each extension of the bumper beam.

In the above embodiment, the bumper beam 20 is fixed to the front end of the side member 10. However, a crash box may be arranged at the front end of each side member, and the bumper beam may be fixed to the front ends of crash boxes.

In the above embodiment and modified examples, the bumper beam has a rectangular cross-section. However, the bumper beam may have other polygonal cross-sections.

The bumper beam does not have to be tubular, or hollow. For example, the bumper beam may include a front wall, a rear wall, and an upper wall connecting the front wall to the real wall. A lower wall may be omitted. Even in this structure, the arrangement of the insertion portion in the bumper beam produces advantage (1) described above.

In the embodiment and modified examples described above, the transfer portion and the insertion portion are arranged at the lateral ends of the bumper beam. However, the position of the transfer portion and the insertion portion is not limited to such a structure. The transfer portion and the insertion portion may be arranged in any section of the bumper beam that is located outward from the side member. Thus, the transfer portion and the insertion portion may be arranged at a section of the bumper beam that is laterally inward from the lateral end of the bumper beam.

The present examples and embodiments are to be considered as illustrative and not restrictive and the invention is not to be limited to the details given herein, but may be modified within the scope and equivalence of the appended claims.

The invention claimed is:

1. A front structure of a vehicle comprising:
two side members extending in a front-rear direction of the vehicle;
a bumper beam located in front of the side members and extending in a lateral direction of the vehicle, wherein the bumper beam is fixed to the side members and includes outer sections located outward in the lateral direction from the corresponding side member;
a transfer portion extending generally rearward in the front-rear direction from at least one of the outer sections;
an insertion portion inserted into the at least one of the outer sections; and
a coupling member that fixes the transfer portion to the insertion portion and to the bumper beam, wherein the transfer portion and the insertion portion hold the bumper beam therebetween, and the transfer portion is located rearward of the insertion portion.

2. The front structure of a vehicle according to claim 1, wherein the insertion portion is connected to the transfer portion outside the bumper beam.

3. The front structure of a vehicle according to claim 2, wherein the insertion portion is formed integrally with the transfer portion.

4. The front structure of a vehicle according to claim 1, wherein the insertion portion extends through the entire interior of the outer section in a generally front-rear direction of the vehicle.

5. The front structure of a vehicle according to claim 1, wherein
the bumper beam includes a front wall and a rear wall, and
the insertion portion extends from the front wall to the rear wall in the outer section.

6. The front structure of a vehicle according to claim 1, wherein
a cross-sectional view of the bumper beam perpendicular to a longitudinal direction of the bumper beam shows the interior of the bumper beam divided into a plurality of compartments, and
the insertion portion is arranged in at least one of the compartments.

7. The front structure of a vehicle according to claim 1, wherein the insertion portion is formed integrally with the transfer portion.

8. The front structure of a vehicle according to claim 1, wherein the insertion portion is substantially a solid body.

9. The front structure of a vehicle according to claim 1, wherein the insertion portion is made of a hard resin material.

10. The front structure of a vehicle according to claim 1, wherein
the bumper beam is hollow, and
the insertion portion is inserted into the at least one of the outer sections such that an interior space of the at least one outer section is substantially filled with the insertion portion.

11. A front structure of a vehicle comprising:
two side members extending in a front-rear direction of the vehicle;
a bumper beam located in front of the side members and extending in a lateral direction of the vehicle, wherein the bumper beam is fixed to the side members and includes outer sections located outward in the lateral direction from the corresponding side member;
a transfer portion extending generally rearward in the front-rear direction from at least one of the outer sections, the transfer portion being separated from the corresponding side member in the lateral direction of the vehicle; and
an insertion portion inserted into the at least one of the outer sections,
wherein the transfer portion and the insertion portion hold the bumper beam therebetween, and the transfer portion is located rearward of the insertion portion, and
wherein the bumper beam includes a rear wall having an inner surface and an outer surface opposite to each other, the insertion portion faces the inner surface of the rear wall and the transfer portion faces the outer surface of the rear wall.

* * * * *